US008977036B2

(12) United States Patent
Kwon et al.

(10) Patent No.: US 8,977,036 B2
(45) Date of Patent: *Mar. 10, 2015

(54) APPARATUS AND METHOD FOR 3D IMAGE CONVERSION AND A STORAGE MEDIUM THEREOF

(75) Inventors: Oh-yun Kwon, Seoul (KR); Hye-hyun Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

This patent is subject to a terminal disclaimer.

(21) Appl. No.: 13/482,238

(22) Filed: May 29, 2012

(65) Prior Publication Data
US 2012/0308118 A1 Dec. 6, 2012

(30) Foreign Application Priority Data

May 31, 2011 (KR) .......... 10-2011-0052378

(51) Int. Cl.
G06K 9/00 (2006.01)
H04N 13/02 (2006.01)
(52) U.S. Cl.
CPC ........ H04N 13/026 (2013.01); H04N 2213/003 (2013.01)
USPC ....................................... 382/154
(58) Field of Classification Search
None
See application file for complete search history.

(56) References Cited

U.S. PATENT DOCUMENTS

| 8,538,135 | B2 * | 9/2013 | Izumi ............................ 382/154 |
| 2010/0080448 | A1 * | 4/2010 | Tam et al. ..................... 382/154 |
| 2010/0111417 | A1 | 5/2010 | Ward et al. |
| 2010/0166338 | A1 | 7/2010 | Lee et al. |
| 2011/0074784 | A1 * | 3/2011 | Turner et al. .................. 345/427 |
| 2011/0075922 | A1 | 3/2011 | Turner et al. |
| 2011/0090318 | A1 * | 4/2011 | Chen et al. ...................... 348/50 |
| 2012/0051625 | A1 * | 3/2012 | Appia et al. .................. 382/154 |
| 2012/0288184 | A1 * | 11/2012 | Zomet ........................... 382/154 |
| 2012/0306865 | A1 * | 12/2012 | Kwon et al. .................. 345/419 |
| 2012/0306866 | A1 * | 12/2012 | Kwon et al. .................. 345/419 |

FOREIGN PATENT DOCUMENTS

WO 2004/021151 A2 3/2004

OTHER PUBLICATIONS

Communication from the European Patent Office issued Aug. 14, 2012 in counterpart European Application No. 12160962.2.

* cited by examiner

Primary Examiner — Stephen R Koziol
Assistant Examiner — Amandeep Saini
(74) Attorney, Agent, or Firm — Sughrue Mion, PLLC

(57) ABSTRACT

An apparatus and method for converting a two-dimensional (2D) input image into a three-dimensional (3D) image, and a storage medium thereof are provided, the method being implemented by the 3D-image conversion apparatus including receiving an input image including a plurality of frames; selecting a first frame corresponding to a preset condition among the plurality of frames; extracting a first object from the selected first frame; inputting selection for one depth information setting mode among a plurality of depth information setting modes with regard to the first object; generating first depth information corresponding to the selected setting mode with regard to the first object; and rendering the input image based on the generated first depth information.

21 Claims, 8 Drawing Sheets

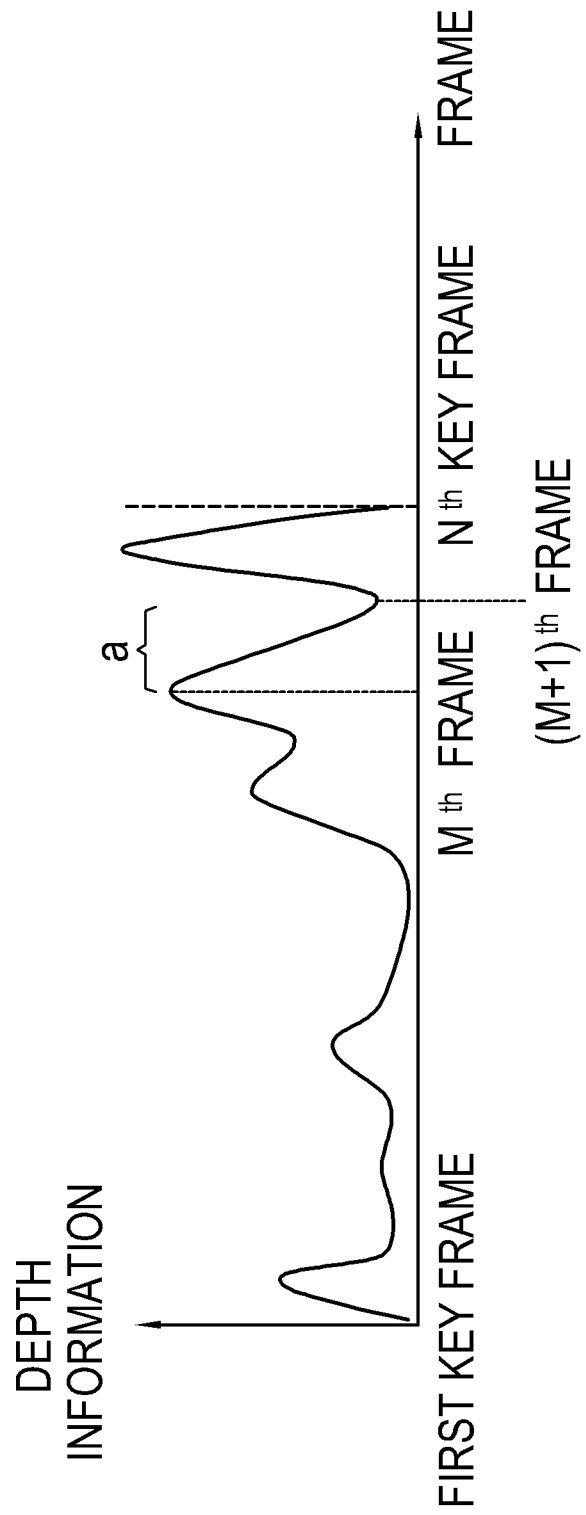

APPARATUS AND METHOD FOR 3D IMAGE CONVERSION AND A STORAGE MEDIUM THEREOF

CROSS-REFERENCE TO RELATED APPLICATION

This application claims priority from Korean Patent Application No. 10-2011-0052378, filed on May 31, 2011 in the Korean Intellectual Property Office, the disclosure of which is incorporated herein by reference.

BACKGROUND

1. Field

Apparatuses and methods consistent with the exemplary embodiments relate to an apparatus and method for three-dimensional (3D) image conversion and a storage medium thereof, and more particularly, to an apparatus and method for converting a two-dimensional (2D) image into a 3D image and a non-transitory computer-readable recorded medium thereof.

2. Description of the Related Art

A lot of display apparatuses capable of reproducing a 3D image have recently been developed. However, production of 3D image contents is not keeping pace with the development of a 3D-image reproducing apparatus. Usually, it takes much cost and time, such as a large-scale apparatus, manpower, etc. to produce a 3D image. Accordingly, the existing 2D image has been converted into a 3D image so as to produce the 3D image content, but there is a need to develop an apparatus and method for 3D image conversion taking the quality and economical efficiency of the 3D image into account.

SUMMARY

Accordingly, one or more exemplary embodiments provide an apparatus and method for three-dimensional (3D) image conversion and a non-transitory computer-readable recorded medium thereof, taking the quality and economical efficiency of a 3D image into account.

The foregoing and/or other aspects may be achieved by providing a method implemented by a three-dimensional (3D) image conversion apparatus, the method including: receiving an input image including a plurality of frames; selecting a first frame corresponding to a preset condition among the plurality of frames; extracting a first object from the selected first frame; inputting selection for one depth information setting mode among a plurality of depth information setting modes with regard to the first object; generating first depth information corresponding to the selected setting mode with regard to the first object; and rendering the input image based on the generated first depth information.

The selecting the first frame may include selecting at least one key frame among the plurality of frames; and selecting a first frame corresponding to at least one frame among all the frames excepting for the key frame among the plurality of frames.

The selecting the first frame may include selecting a first frame corresponding to at least one frame located between two selected key frames.

The key frame may be selected based on at least one among scene change, appearance of an important object, and variation in motion of the object in the plurality of frames.

The method may further include extracting a second object from the selected key frame; and generating second depth information with regard to the second object.

The input of the selection for the setting mode may include generating and displaying a user interface (UI) showing the plurality of depth information setting modes; and receiving a user's selection for selecting at least one depth information setting mode among the plurality of depth information setting modes through the displayed UI.

The plurality of depth information setting modes may include a first mode which generates first depth information having a same size as the depth information applied to a frame preceding the first frame; a second mode which generates first depth information larger by a predetermined range than the depth information applied to a frame preceding the first frame; a third mode which generates first depth information corresponding to the second depth information; and a fourth mode which generates first depth information within a predetermined range based on the second depth information.

Another aspect may be achieved by providing a non-transitory computer-readable recorded medium encoded by a command executable by a computer, in which the command performs a method for rendering an input image when the command is executed by a processor, the method including: receiving an input image including a plurality of frames; selecting a first frame corresponding to a preset condition among the plurality of frames; extracting a first object from the selected first frame; inputting selection for one depth information setting mode among a plurality of depth information setting modes with regard to the first object; generating first depth information corresponding to the selected setting mode with regard to the first object; and rendering the input image based on the generated first depth information.

The selecting the first frame may include selecting at least one key frame among the plurality of frames; and selecting a first frame corresponding to at least one frame among all the frames excepting for the key frame among the plurality of frames.

The selecting the first frame may include selecting a first frame corresponding to at least one frame located between two selected key frames.

The key frame may be selected based on at least one among scene change, appearance of an important object, and variation in motion of the object in the plurality of frames.

The non-transitory computer-readable storage medium may further include extracting a second object from the selected key frame; and generating second depth information with regard to the second object.

The input of the selection for the setting mode may include generating and displaying a user interface (UI) showing the plurality of depth information setting modes; and receiving a user's selection for selecting at least one depth information setting mode among the plurality of depth information setting modes through the displayed UI.

The plurality of depth information setting modes may include a first mode which generates first depth information having the same size as the depth information applied to a frame preceding the first frame; a second mode which generates first depth information larger by a predetermined range than the depth information applied to a frame preceding the first frame; a third mode which generates first depth information corresponding to the second depth information; and a fourth mode which generates first depth information within a predetermined range based on the second depth information.

Still another aspect may be achieved by providing an apparatus for three-dimensional (3D)-image conversion, including: a receiver which receives an input image including a plurality of frames; and an image converter which selects a first frame corresponding to a preset condition among the plurality of frames, extracts a first object from the selected first frame, generates first depth information corresponding to selection of one depth information setting mode among a plurality of depth information setting modes with regard to the first object, and renders the input image based on the generated first depth information.

The image converter may select at least one key frame among the plurality of frames; and select a first frame corresponding to at least one frame among all the frames excepting for the key frame among the plurality of frames.

The image converter selects a first frame corresponding to at least one frame located between two selected key frames.

The key frame may be selected based on at least one among scene change, appearance of an important object, and variation in motion of the object in the plurality of frames.

The image converter may extract a second object from the selected key frame; and generate second depth information with regard to the second object.

The apparatus may further include: a user input unit; and a user interface (UI) generator which generates and displays a UI showing the plurality of depth information setting modes, wherein the image converter generates first depth information corresponding to at least one depth information setting mode selected by a user among the plurality of depth information setting modes through the displayed UI.

The plurality of depth information setting modes may include a first mode for generating first depth information having the same size as the depth information applied to a frame preceding the first frame; a second mode for generating first depth information larger by a predetermined range than the depth information applied to a frame preceding the first frame; a third mode for generating first depth information corresponding to the second depth information; and a fourth mode for generating first depth information within a predetermined range based on the second depth information.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 3A to 3D show a depth information generating method based on a depth setting mode of a converting processor in the 3D-image conversion apparatus of FIG. 1;

DETAILED DESCRIPTION OF EXEMPLARY EMBODIMENTS

Figure 1:
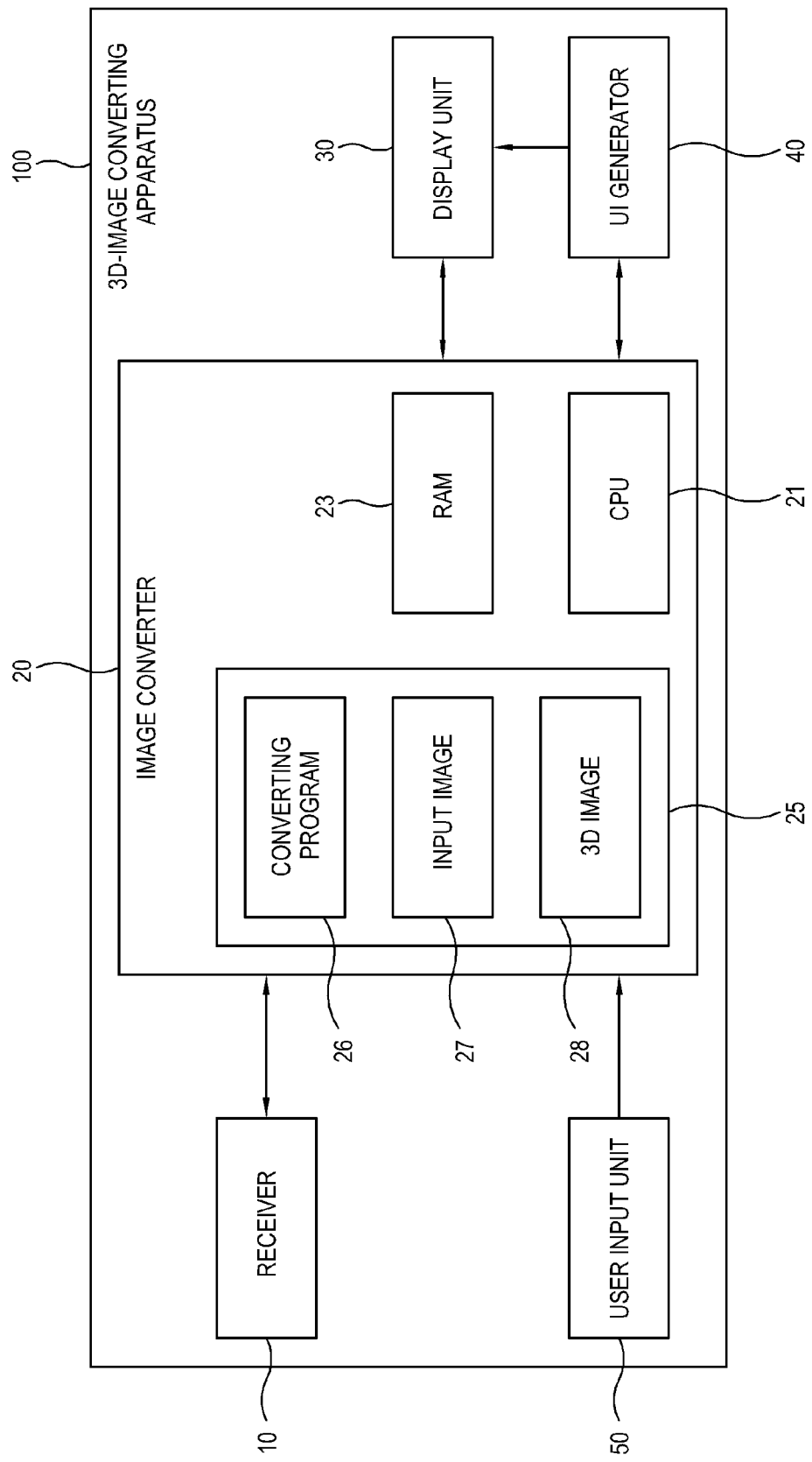
FIG. 1 is a control block diagram showing an apparatus for 3D image conversion according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a control block diagram showing an apparatus for 3D image conversion according to an exemplary embodiment.

A 3D-image conversion or converting apparatus 100 according to an exemplary embodiment is an electronic apparatus capable of receiving a 2D image or monocular image from an external source providing apparatus (not shown) and converting the image into a 3D image or binocular image, and for example includes a display apparatus, particularly a general personal computer (PC) or the like. The 3D-image conversion apparatus 100 according to an exemplary embodiment generates depth information reflecting a user's selection through a predetermined processor with regard to a received input image, and converts the input image into a 3D image based on the generated depth information.

After converting a 2D image received from the source providing apparatus (not shown) into a 3D image, the 3D-image conversion apparatus 100 may stereoscopically display the converted 3D image or transmit the converted 3D image to an external content reproducing apparatus (not shown) capable of reproducing the 3D image, for example, a television (TV), a personal computer (PC), a smart phone, a smart pad, a portable multimedia player (PMP), an MP3 player, etc.

In a network according to an exemplary embodiment, there is no limit to a communication method of the network, such as wired and/or wireless communication methods or the like as long as the communication method is used in data communication for transmitting a 2D image and/or a 3D image, and the data communication includes any known communication method.

As shown in FIG. 1, the 3D-image conversion apparatus 100 includes a receiver 10, an image converter 20, a display unit 30, a user interface (UI) generator 40, and a user input unit 50.

The receiver 10 receives an input image containing a plurality of frames from an external source providing apparatus (not shown). The input image includes a 2D image or a monocular image. A 3D image is based on a viewer's binocular parallax, and includes a plurality of left-eye frames and a plurality of right-eye frames. Among the plurality of left-eye frames and the plurality of right-eye frames, a pair of left-eye and right-eye frames may be each converted from at least one corresponding frame of the plurality of frames in the input image.

The receiver 10 may receive a 2D image from an external source providing apparatus (not shown) through a predetermined network (not shown). For example, as a network server the source providing apparatus stores a 2D image and transmits the 2D image to the 3D-image conversion apparatus 100 as requested by the 3D-image conversion apparatus 100.

According to another exemplary embodiment, the receiver 10 may receive a 2D image from the source providing apparatus (not shown) through not the network but another data transfer means. For example, the source providing apparatus (not shown) may be an apparatus provided with a storage means such as a hard disk, a flash memory, etc. for storing the 2D image, which can be locally connected to the 3D-image conversion apparatus 100 and transmit the 2D image to the 3D-image conversion apparatus 100 as requested by the 3D-image conversion apparatus 100. In this case, if data of an 2D image is transmitted, there is no limit to a local connection method between the receiver 10 and the source providing apparatus (not shown), and the local connection method may for example include a universal serial bus (USB), etc.

The image converter 20 converts an input image received by the receiver 10 into a 3D image. The image converter 20 may include a central processing unit (CPU) 21, a random access memory (RAM) 23, and a storage unit 25. The storage unit 25 may store a converting program 26 for converting a monocular image into a binocular image, a monocular image (or an input image) 27 to be converted, and a binocular image (or a 3D image) 28 completely converted from the monocular image. The storage unit 25 may be achieved by a hard disk, a flash memory, or the like non-volatile memory. The RAM 23 is loaded with at least a part of the converting program 26 when the image converter 20 operates, the CPU 21 executes the converting program 26 loaded into the RAM 23. The converting program 26 contains instructions executable by the CPU 21. The storage unit 25 is an example of a non-transitory computer-readable storage medium. The operation of the image converter 20 will be described in more detail with reference to FIGS. 4 to 6.

The display unit 30 displays a user interface (UI) generated by the UI generator 40 to be described later. Also, the input image being converted by the image converter 20 may be displayed together with the UI. Further, a 3D image completely converted by the image converter 20 may be displayed. Without any limit, the display unit 30 may be achieved by various display types such as liquid crystal, plasma, a light-emitting diode, an organic light-emitting diode, a surface-conduction electron-emitter, a carbon nano-tube, a nano-crystal, etc.

The UI generator 40 may generate the UI for displaying the plurality of depth information setting modes. The generated UI may be achieved in the form of a graphic user interface (GUI). The UI may be generated while converting an input image into a 3D image, so that the UI generator 40 can perform its own function under control of the CPU 21 of the image converter 20.

The user input unit 50 is a user interface for receiving a user's input, which receives a user's selection related to the function or operation of the 3D-image conversion apparatus 100. The user input unit 50 may be provided with at least one key button, and may be achieved by a control panel or touch panel provided in the 3D-image conversion apparatus 100. Also, the user input unit 50 may be achieved in the form of a remote controller, a keyboard, a mouse, etc., which is connected to the 3D-image conversion apparatus 100 through a wire or wirelessly.

Below, the image converter 20 will be described in more detail with reference to FIGS. 2 to 4.

Figure 2:
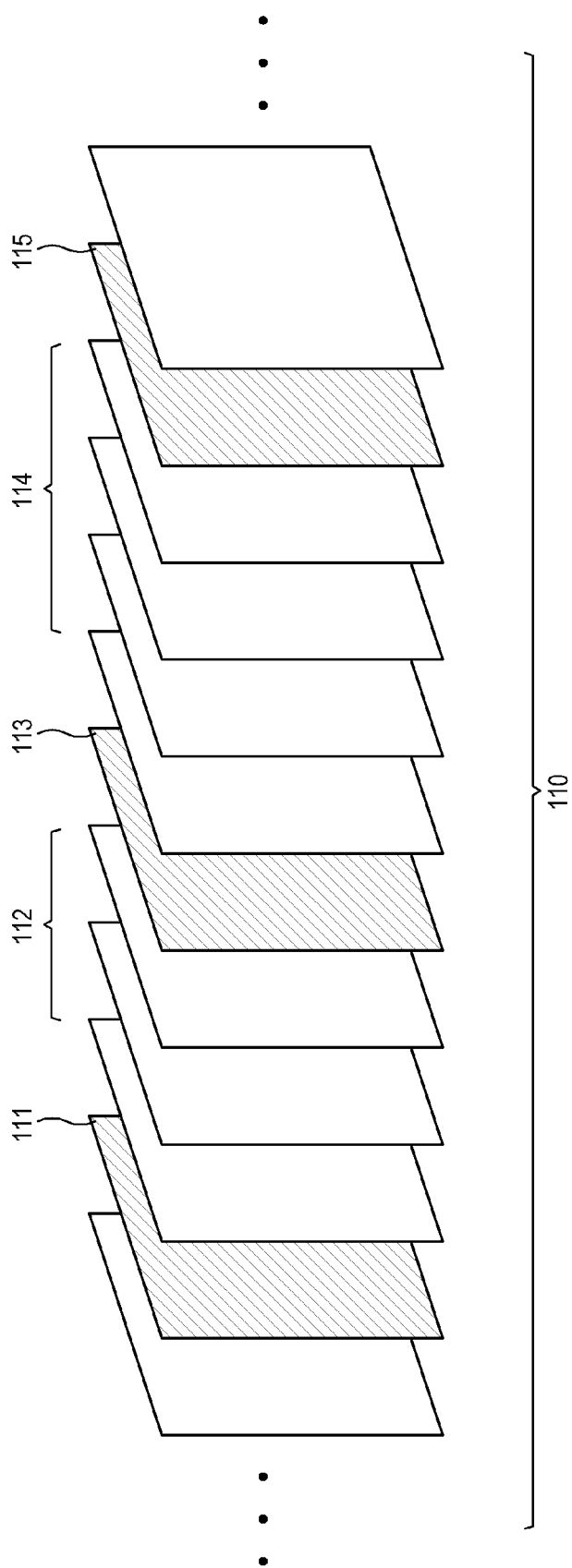
FIG. 2 illustrates first frame selection in the 3D-image conversion apparatus of FIG. 1.

FIG. 2 illustrates first frame selection in the 3D-image conversion apparatus of FIG. 1.

If an input image containing plural frames 110 is received through the receiver 10, the image converter 20 selects a first frame corresponding to a preset condition among the plural frames 110. The first frame corresponding to the present condition includes at least one frame 112, 114 corresponding to all the frames excepting for key frames 111, 113 and 115 among the plural frames. For example, the first frame includes at least one frame 112 located between the two key frames 111 and 113.

At this time, the image converter 20 selects at least one key frame based on a scene change, appearance of an important object, and variation in motion of the object in the plural frames. The image converter 20 extracts at least one object in the key frame if at least one key frame is selected, and generates second depth information about the extracted at least one object. The second depth information to be applied to the object of the key frame may be generated using a generally known depth estimation algorithm. Alternatively, the second depth information to be applied to the object of the key frame may be generated based on a user's selection using a predetermined UI. The image converter 20 may graph change in the second depth information to be applied to the objects in the plural key frames, from the first key frame to the final key frame, of the input image, an example of which is illustrated in FIG. 3A. FIG. 3A shows a curve of change in the depth information from the first key frame to the final key frame, and which may be used in generating the first depth information of the first frame.

The image converter 20 extracts the first object in the first frame if the first frame is selected corresponding to the preset condition. At this time, the first object represents at least one object contained in the first frame. For example, the first frame may include a plurality of objects.

Figure 4:
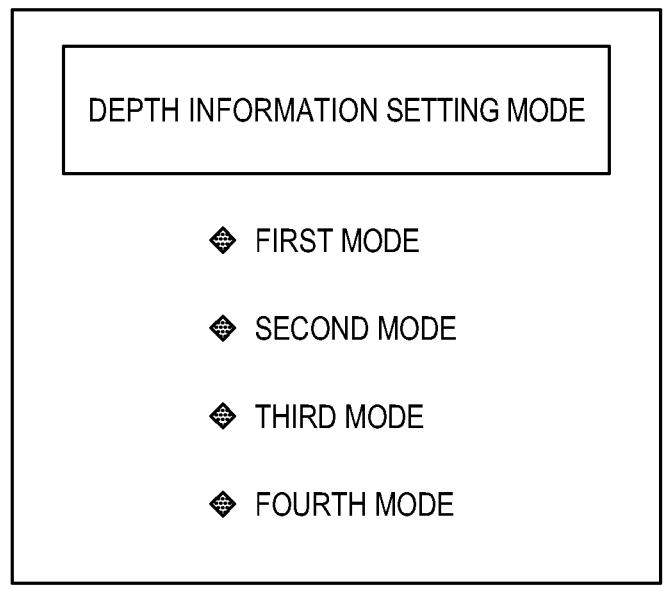
FIG. 4 shows an example of generating and displaying a user interface (UI) in the 3D-image conversion apparatus of FIG. 1.

The image converter 20 may control the UI generator 40 to generate and display a UI showing a plurality of depth information setting modes for generating first depth information about the first object in the first frame, an example of which is illustrated in FIG. 4. Referring to FIG. 4, the UI includes a plurality of depth information setting modes to be selected by a user, and for example includes icons for selecting first to fourth modes. If a user selects one of the first to fourth modes through the user input unit 50, the image converter 20 generates depth information corresponding to the mode selected by a user. The image converter 20 renders the input image based on the depth information generated corresponding to the depth mode selected by the user, thereby resulting in generating a 3D image.

Figure 3B:
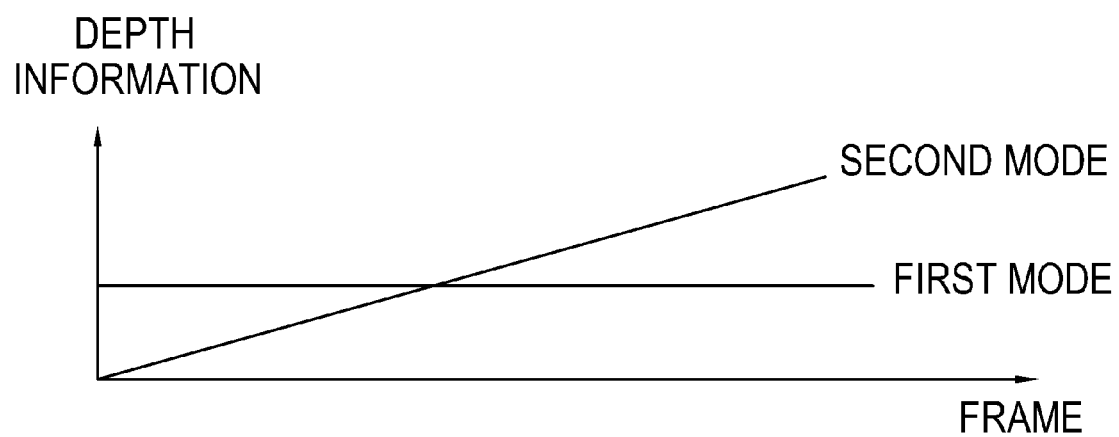
Figure 3C:
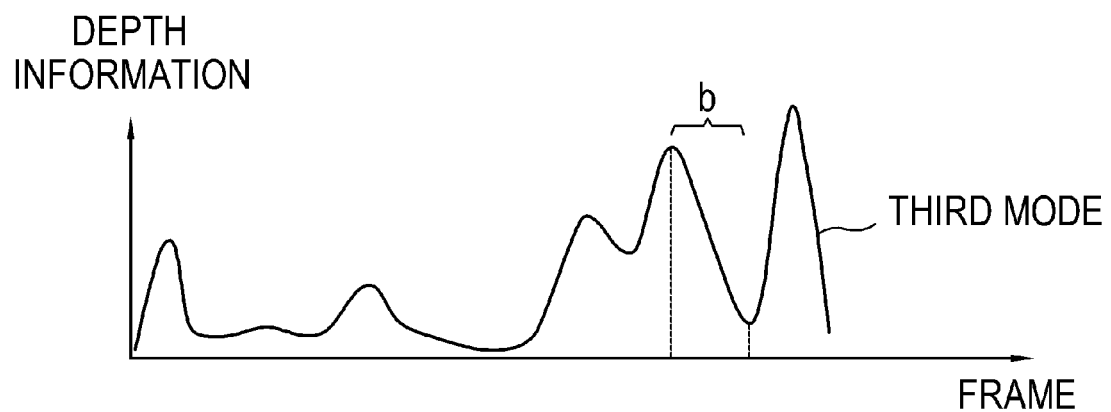
Figure 3D:
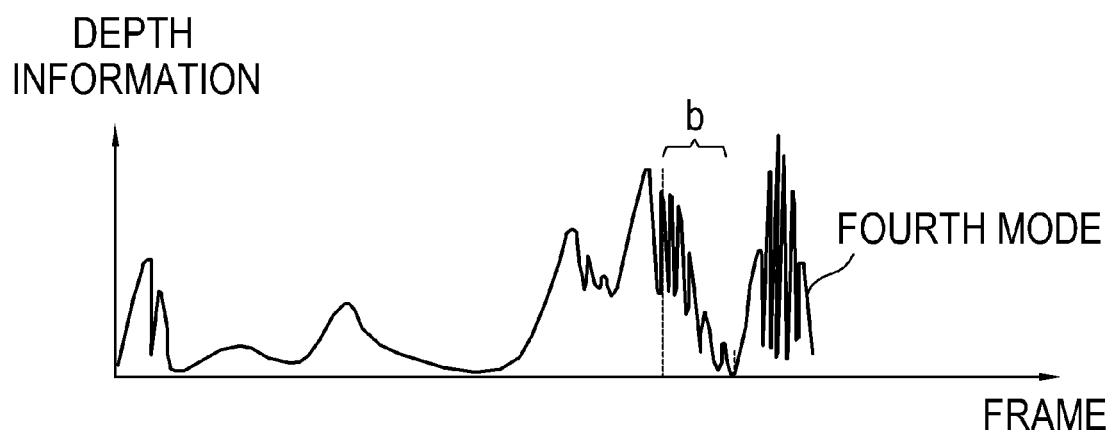

FIG. 3B shows the first mode and the second mode, FIG. 3C shows the third mode, and FIG. 3D shows the fourth mode. As shown in FIG. 3B, the first mode is a mode for generating depth information having the same size as the depth information applied to a frame preceding the first frame. Thus, the first mode is a mode for applying the depth information having a preset certain size to the first object of the first frame. The second mode is a mode for generating first depth information larger by a predetermined range than the depth information applied to a frame preceding the first frame. Thus, in the second mode, the depth information gradually increases as time goes by.

As shown in FIG. 3C, the third mode is a mode for generating the first depth information corresponding to the second depth information to be applied to the object of the key frame. For example, if a curve of change in the depth information between the Mth key frame and the (M+1)th key frame shows decrease of the depth information like a section 'a', at least one depth information of the first frame located between the Mth key frame and the (M+1)th key frame is adjusted to become depth information like that of a section 'b' changing equally or similarly to the section 'a' (refer to FIG. 3A and FIG. 3C).

As shown in FIG. 3D, the fourth mode is a mode for generating the first depth information increased or decreased within a predetermined range based on the second depth information to be applied to the object of the first key frame. For example, if a curve of change in the depth information between the Mth key frame and the (M+1)th key frame shows decrease of the depth information like the section 'a', at least one depth information of the first frame located between the Mth key frame and the (M+1)th key frame is adjusted to become depth information like that of the section 'b' by generating the first depth information more increased or decreased within a certain range than that of the section 'a' (refer to FIG. 3A and FIG. 3D). Therefore, the depth information is so largely increased or decreased in the fourth mode that a viewer can feel a more extreme cubic effect.

As described above, the 3D-image conversion apparatus 100 according to an exemplary embodiment has merits that the depth information is generated with regard to the key frame among the plurality of frames constituting the input image and the depth information of the mode based on the user's selection is applied to all the frames excepting for the key frame in the plurality of frames. Thus, it has very high economical effects in light of time and costs rather than that of when the depth information is generated and applied to all the frames in a lump.

Figure 5:
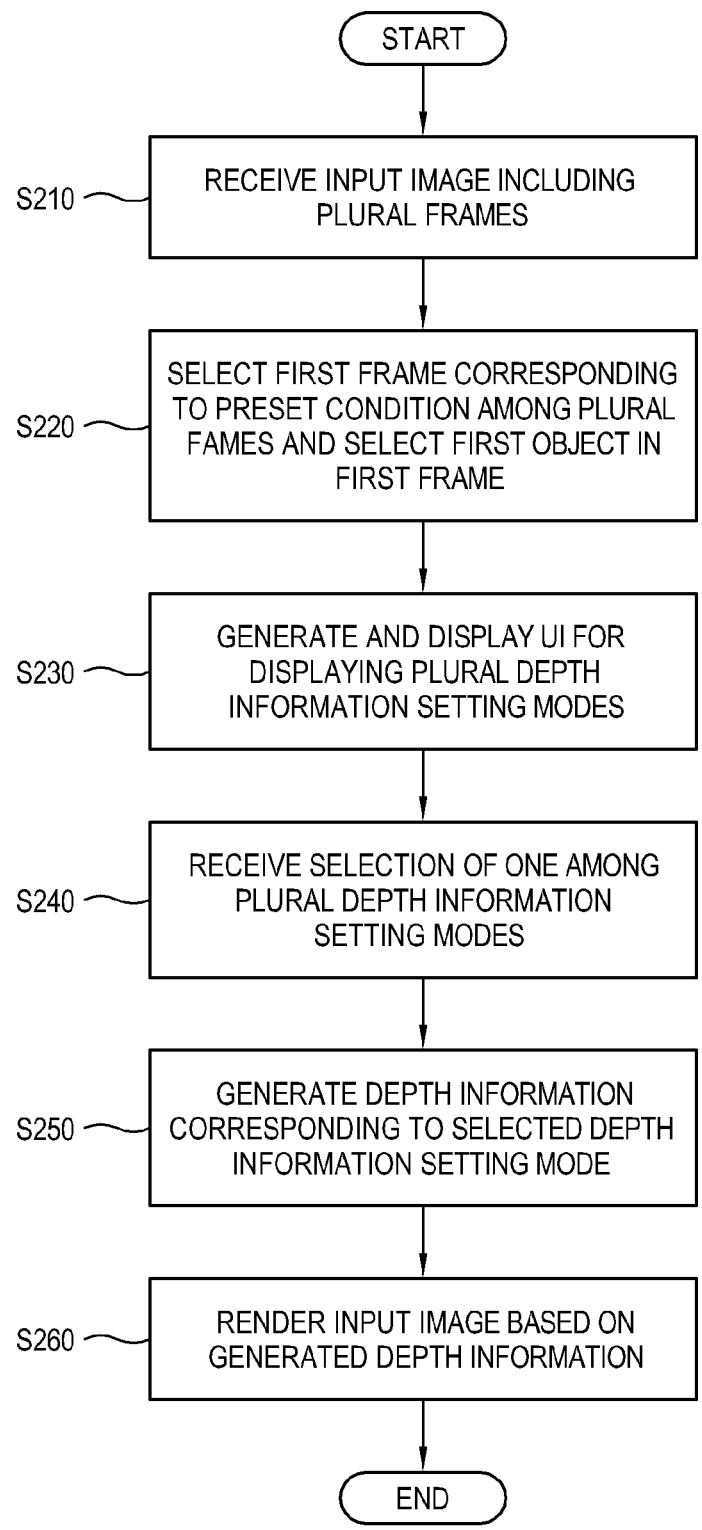
FIG. 5 is a flowchart showing operations of the 3D-image conversion apparatus of FIG. 1.

FIG. 5 is a flowchart showing operations of the 3D-image conversion apparatus of FIG. 1.

An input image containing a plurality of frames is received (S210), and a first frame is selected corresponding to a preset condition among the plurality of frames (S220). Among the plurality of frames, the first frame is at least one frame selected among all the frames excepting for the key frame. Further, a first object may be further extracted from the selected first frame (S220). Also, the selection of the first frame may further include selecting at least one key frame among the plurality of frames, select a second object in the key frame, and generate second depth information about the second object.

A UI showing a plurality of depth information setting modes with regard to the first object is generated and displayed (S230), and selection for one depth information setting mode among the plurality of depth information setting modes is input through the displayed UI (S240).

First depth information corresponding to the selected setting mode with regard to the first object is generated (S250), and the input image is rendered using the generated first depth information to thereby generate a 3D image (S260).

Further, the generated 3D image may be displayed on the 3D-image conversion apparatus 100.

Also, the generated 3D image may be transmitted to an external content reproducing apparatus (not shown).

The method implemented by the 3D-image conversion apparatus according to an exemplary embodiment may be achieved in the form of a program command executable by various computers and stored in a non-transitory computer-readable recorded medium. The non-transitory computer-readable recorded medium may include the single or combination of a program command, a data file, a data structure, etc. The program command recorded in the storage medium may be specially designed and configured for the present exemplary embodiment, or publicly known and usable by a person having a skill in the art of computer software. For example, the non-transitory computer-readable recorded medium includes magnetic media such as a hard disk, a floppy disk and a magnetic tape; optical media such as a compact-disc read only memory (CD-ROM) and a digital versatile disc (DVD); magnet-optical media such as a floptical disk; and a hardware device specially configured to store and execute the program command, such as a ROM, a random access memory (RAM), a flash memory, etc. For example, the program command includes not only a machine code generated by a compiler but also a high-level language code executable by a computer using an interpreter or the like. The hardware device may be configured to operate as one or more software modules for implementing the method according to an exemplary embodiment, and vice versa.

As described above, there are provided an apparatus and method for converting a 2D image into a 3D image while taking the quality and economical efficiency of the image into account, and a storage medium thereof.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A method implemented by a three-dimensional (3D) image conversion apparatus, the method comprising:
   receiving an input image comprising a plurality of frames including at least one key frame;
   selecting a first frame corresponding to a preset condition among the plurality of frames, wherein the first frame is not one of the at least one key frame;
   extracting a first object from the selected first frame;
   inputting selection for one depth information setting mode among a plurality of depth information setting modes with regard to the first object, wherein depth information corresponding to each of the depth information setting modes is generated on the basis of depth information of a key frame;
   generating first depth information corresponding to the selected depth information setting mode with regard to the first object; and
   rendering the input image based on the generated first depth information.

2. The method according to claim 1, further comprising:
   selecting the at least one key frame among the plurality of frames.

3. The method according to claim 2, wherein the selecting the first frame comprises selecting the first frame corresponding to at least one frame located between two selected key frames.

4. The method according to claim 2, wherein the at least one key frame is selected based on at least one among scene change, appearance of an important object, and variation in motion of the object in the plurality of frames.

5. The method according to claim 2, further comprising:
   extracting a second object from the selected at least one key frame; and
   generating second depth information with regard to the second object.

6. The method according to claim 1, wherein the input of the selection for the setting mode comprises:
   generating and displaying a user interface (UI) showing the plurality of depth information setting modes; and
   receiving a user's selection for selecting at least one depth information setting mode among the plurality of depth information setting modes through the displayed UI.

7. The method according to claim 1, wherein the plurality of depth information setting modes comprises:
   a first mode which generates first depth information having a same size as the depth information applied to a frame preceding the first frame;
   a second mode which generates first depth information larger by a predetermined range than the depth information applied to the frame preceding the first frame;
   a third mode which generates first depth information corresponding to the second depth information; and
   a fourth mode which generates first depth information within a predetermined range based on the second depth information.

8. A non-transitory computer-readable recorded medium encoded by a command executable by a computer, in which the command performs a method for rendering an input image when the command is executed by a processor, the method comprising:
   receiving an input image comprising a plurality of frames including at least one key frame;

selecting a first frame corresponding to a preset condition among the plurality of frames, the first frame is not one of the at least one key frame;

extracting a first object from the selected first frame;

inputting selection for one depth information setting mode among a plurality of depth information setting modes with regard to the first object;

generating first depth information corresponding to the selected depth information setting mode with regard to the first object; and rendering the input image based on the generated first depth information, wherein depth information corresponding to each of the depth information setting modes is generated on the basis of depth information of a key frame.

9. The non-transitory computer-readable recorded medium according to claim 8, further comprising:

selecting the at least one key frame among the plurality of frames.

10. The non-transitory computer-readable recorded medium according to claim 9, wherein the selecting the first frame comprises selecting the first frame corresponding to at least one frame located between two selected key frames.

11. The non-transitory computer-readable recorded medium according to claim 9, wherein the key frame is selected based on at least one among scene change, appearance of an important object, and variation in motion of the object in the plurality of frames.

12. The non-transitory computer-readable recorded medium according to claim 9, further comprising:

extracting a second object from the selected key frame; and generating second depth information with regard to the second object.

13. The non-transitory computer-readable recorded medium according to claim 8, wherein the input of the selection for the setting mode comprises:

generating and displaying a user interface (UI) showing the plurality of depth information setting modes; and receiving a user's selection for selecting at least one depth information setting mode among the plurality of depth information setting modes through the displayed UI.

14. The non-transitory computer-readable recorded medium according to claim 8, wherein the plurality of depth information setting modes comprises:

a first mode which generates first depth information having a same size as the depth information applied to a frame preceding the first frame;

a second mode which generates first depth information larger by a predetermined range than the depth information applied to a frame preceding the first frame;

a third mode which generates first depth information corresponding to the second depth information; and a fourth mode which generates first depth information within a predetermined range based on the second depth information.

15. An apparatus for three-dimensional (3D)-image conversion, comprising:

a receiver which receives an input image comprising a plurality of frames including at least one key frame; and an image converter which selects a first frame corresponding to a preset condition among the plurality of frames, extracts a first object from the selected first frame, generates first depth information corresponding to selection of one depth information setting mode among a plurality of depth information setting modes with regard to the first object, and renders the input image based on the generated first depth information, wherein the first frame is not one of the at least one key frame, and wherein depth information corresponding to each of the depth information setting modes is generated on the basis of depth information of a key frame.

16. The apparatus according to claim 15, wherein the image converter selects at least one key frame among the plurality of frames.

17. The apparatus according to claim 16, wherein the image converter selects the first frame corresponding to at least one frame located between two selected key frames.

18. The apparatus according to claim 16, wherein the at least one key frame is selected based on at least one among scene change, appearance of an important object, and variation in motion of the object in the plurality of frames.

19. The apparatus according to claim 16, wherein the image converter extracts a second object from the selected at least one key frame; and generates second depth information with regard to the second object.

20. The apparatus according to claim 15, further comprising:

a user input unit; and a user interface (UI) generator which generates and displays a UI showing the plurality of depth information setting modes, wherein the image converter generates first depth information corresponding to at least one depth information setting mode selected by a user among the plurality of depth information setting modes through the displayed UI.

21. The apparatus according to claim 15, wherein the plurality of depth information setting modes comprises:

a first mode which generates first depth information having a same size as the depth information applied to a frame preceding the first frame;

a second mode which generates first depth information larger by a predetermined range than the depth information applied to the frame preceding the first frame;

a third mode which generates first depth information corresponding to the second depth information; and a fourth mode which generates first depth information within a predetermined range based on the second depth information.

* * * * *